(12) United States Patent
Old

(10) Patent No.: US 7,701,260 B1
(45) Date of Patent: Apr. 20, 2010

(54) PHASE-TO-SINUSOID CONVERSION

(75) Inventor: Gordon Old, Edinburgh (GB)

(73) Assignee: XILINX, Inc., San Jose, CA (US)

( * ) Notice: Subject to any disclaimer, the term of this patent is extended or adjusted under 35 U.S.C. 154(b) by 130 days.

(21) Appl. No.: 11/807,113

(22) Filed: May 25, 2007

(51) Int. Cl.
*H03B 21/00* (2006.01)
(52) U.S. Cl. ........................... 327/106; 327/129
(58) Field of Classification Search ......... 327/105–107, 327/129
See application file for complete search history.

(56) References Cited

U.S. PATENT DOCUMENTS

| | | | |
|---|---|---|---|
| 5,014,231 A * | 5/1991 | Reinhardt et al. ........... | 708/271 |
| 6,038,276 A * | 3/2000 | Dinh ........................... | 375/376 |
| 6,310,653 B1 * | 10/2001 | Malcolm et al. ............ | 348/537 |
| 6,333,649 B1 | 12/2001 | Dick et al. | |
| 7,071,787 B2 * | 7/2006 | Knierim et al. ............. | 331/1 A |
| 2007/0298733 A1 * | 12/2007 | Cole et al. ................ | 455/114.2 |

* cited by examiner

*Primary Examiner*—Long Nguyen
*Assistant Examiner*—Sibin Chen
(74) *Attorney, Agent, or Firm*—W. Eric Webostad

(57) ABSTRACT

Phase-to-sinusoid conversion and method for direct digital synthesis are described. At least one quadrant of values for a sinusoidal signal are real-to-finite bit resolution mapped to provide preconditioned values which are on average shifted down by half of a LSB position. The at least one quadrant of preconditioned values are stored in a lookup table. MSBs of a phase-accumulated signal are used as an address for accessing from the lookup table a sinusoid value. At least a logic 1 is added as an LSB to an interim output associated with the sinusoid value to provide an adjusted sinusoid value having a bit width greater than that of the sinusoid value to provide a digitally synthesized sinusoidal value.

19 Claims, 5 Drawing Sheets

PHASE-TO-SINUSOID CONVERSION

FIELD OF THE INVENTION

One or more aspects of the invention relate generally to integrated circuits and, more particularly, to a phase-to-sinusoid conversion.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

In a Direct Digital Synthesizer ("DDS") or a Numerically Controlled Oscillator ("NCO"), a lookup table ("LUT") may be implemented for performing a phase-to-sinusoid conversion. Conventionally, to reduce the memory footprint of such a LUT, quadrant symmetry is used for storing only a quarter of a full cycle of sinusoid values for purposes of phase-to-sinusoid conversion. The other three quadrants of such a full cycle may be derived by complementing an address input to the LUT or complementing sinusoid values obtained from the lookup table, or a combination thereof. Thus, for example, the mathematical properties of a sine wave may be used, namely $\sin(180+x)=-\sin(x)$ and $\sin(180-x)=\sin(x)$, to obtain the other three quarter waves. For obtaining cosine values from a lookup table of sine values, the equation $\cos(x)=\sin(90-x)$ may be used.

Because only one quadrant of sinusoid values or samples is stored in a LUT, conventionally output from such a LUT was complemented using a 2's complement. An example of a 2's complement output from a LUT may be found in U.S. Pat. No. 6,333,649. It should be appreciated that a sinusoid's amplitude resolution is dependent upon the width of the LUT, whereas the depth of the LUT affects the phase angle resolution of the sinusoid. However, sinusoid values in the LUT are conventionally rounded to accommodate a target amplitude resolution while limiting the bit width.

As rounded sinusoid values in a LUT are conventionally stored as positive numbers, there is no need to store a sign bit. Thus, such sinusoid values stored in a LUT conventionally are unsigned. However, after a sinusoid value is output from a LUT, a logic 0 or 1 may be pre-appended to expressly indicate that the value is either positive or negative, respectively, for using a 2's complement notation. Notably, an unsigned value is conventionally signed prior to any 2's complementing operation on such a value. To negate such a number in such a two's complement representation, all bits of the number are inverted and then a logic 1 is added to the LSB of such an inverted number. This addition of a logic 1 conventionally involves a true arithmetic add rather than simply a logic function applied to each bit independently. In short, this means that a carry chain is implemented for a 2's complement on an output from such a LUT. A carry chain may be speed-limiting with respect to digital signal processing. Thus, a carry chain may be a limit on an upper speed at which a digital signal processing circuit may be operated. Even where ripple carry logic is supported, a carry chain may be a limiting factor in digital signal processing speed. Notably, there are other forms of arithmetic addition that may be implemented, including carry lookahead, and carry-skip, carry-save, among others.

Accordingly, it would be both desirable and useful to provide phase-to-sinusoid conversion without having to use a carry chain as associated with a 2's complement, while having a LUT that stores only a portion for a cycle of a sinusoid.

SUMMARY OF THE INVENTION

One or more aspects of the invention generally relate to integrated circuits and, more particularly, to a phase-to-sinusoid conversion.

An aspect of the invention relates generally to a phase-to-sinusoid converter. The phase-to-sinusoid converter includes a lookup table associated with input mapping circuitry. The lookup table has at least one quadrant of values for a sinusoidal signal stored therein, where the at least one quadrant of values are reduced from associated predetermined values thereof. The lookup table is configured to have two address ports and two data out ports respectively associated with the address ports. The lookup table is coupled to receive a first portion of a phase-accumulated signal to the address ports and is configured to map the first portion of the phase-accumulated signal to an associated quadrant for providing a cosine value and a sine value obtained from the at least one quadrant of values. Control circuitry is coupled to receive the cosine value and the sine value for selective inverting thereof for quadrant mapping, where the control circuitry does not have a carry chain.

Another aspect of the invention relates generally a phase-to-sinusoid converter. Quadrant mapping circuitry is coupled to receive a portion of a phase-accumulated signal for providing a address. A lookup table having at least one quadrant of values for a sinusoidal signal stored therein is coupled to receive the address, where the at least one quadrant of values is reduced from associated predetermined values thereof. The lookup table is configured to output a sinusoid value from the at least one quadrant of values responsive to the address. Inverter circuitry is coupled to receive the sinusoid value and configured to provide a inverted sinusoid value. Multiplexer circuitry is coupled to receive the sinusoid value and the inverted sinusoid value as respective data inputs. The multiplexer circuitry is further coupled to receive a control select signal responsive to a part of the portion of the phase-accumulated signal. The control select signal is for selecting the inverted sinusoid value or the sinusoid value as a sinusoidal interim output. An adder/subtractor is coupled to receive the sinusoidal interim output. The adder/subtractor is further coupled to receive a logic 1 bit and bit-shifted logic 0s, where the logic 1 bit is received as a Least Significant Bit with respect to the sinusoidal interim output increasing data width of the sinusoidal interim output by one bit. The adder/subtractor is configured to provide a sinusoidal output.

Yet another aspect of the invention generally relates to a method for direct digital synthesis. Real-to-finite bit resolution of at least one quadrant of values for a sinusoidal signal is mapped to provide at least one quadrant of preconditioned values, where the at least one quadrant of preconditioned values is on average shifted down by half of a least significant bit position. The at least one quadrant of preconditioned values is stored in a lookup table. Most Significant Bits of a phase-accumulated signal are obtained as a address. Accessed from the lookup table is a sinusoid value from the at least one quadrant of preconditioned values responsive to the address. At least a logic 1 is added as a Least Significant Bit to a interim output associated with the sinusoid value to provide a adjusted sinusoid value having a bit width greater than that of the sinusoid value for providing a digitally synthesized sinusoidal value.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
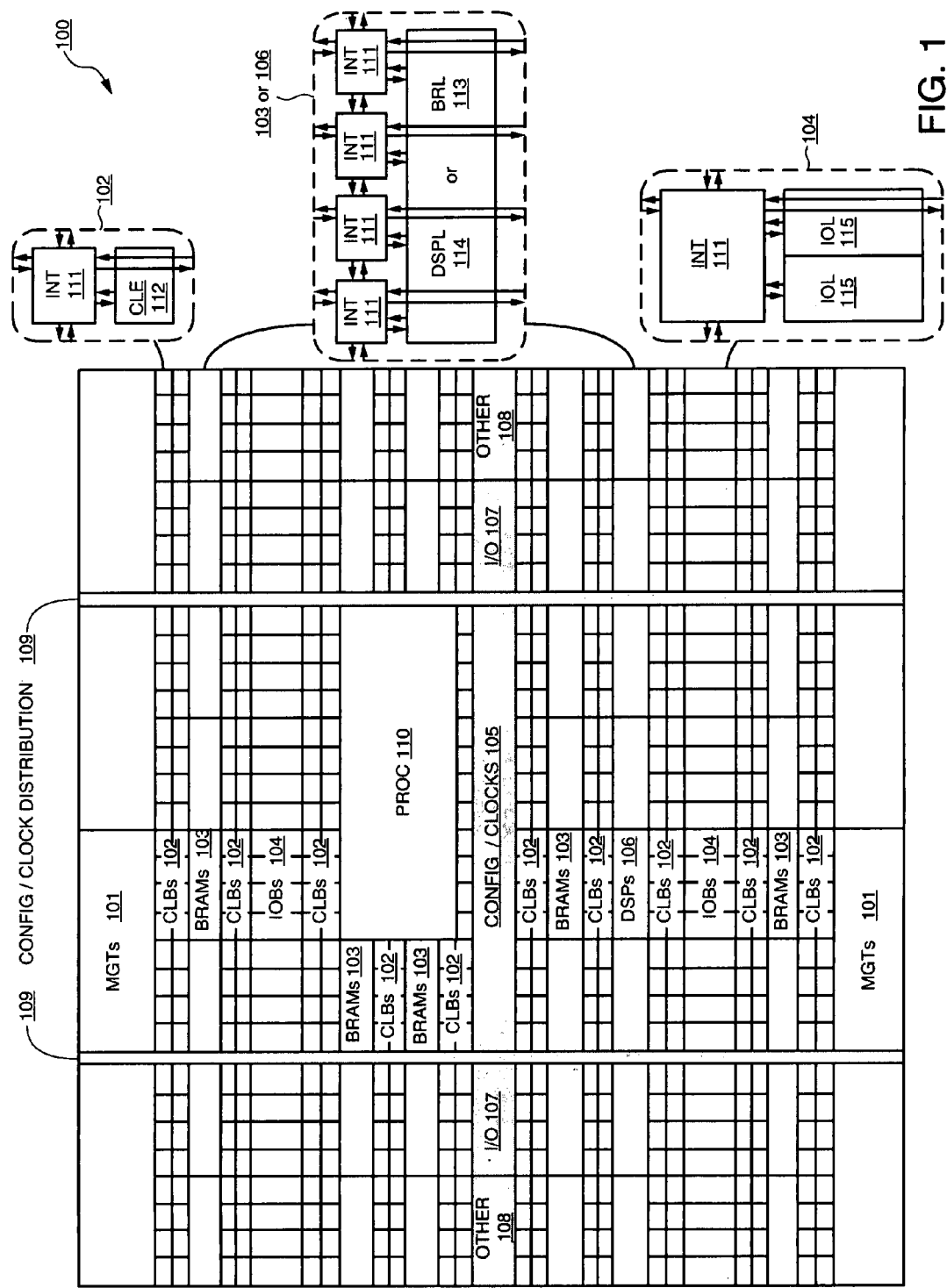
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ or Virtex-5™ FPGA from Xilinx of San Jose, Calif.

Figure 2:
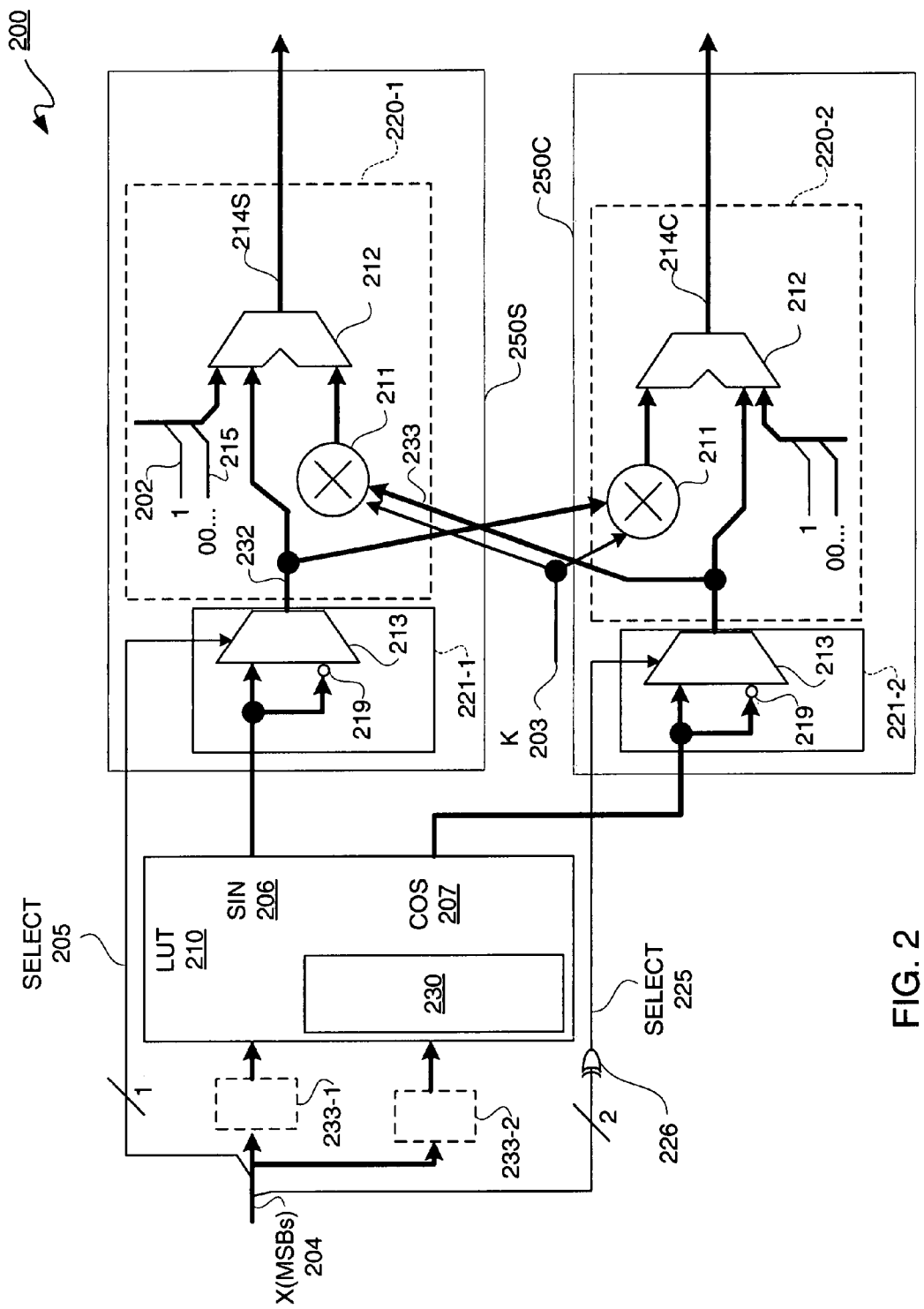
FIG. 2 is a circuit/block diagram depicting an exemplary embodiment of a phase-to-sinusoid converter.

FIG. 2 is a circuit/block diagram depicting an exemplary embodiment of a phase-to-sinusoid converter 200. Phase-to-sinusoid converter ("converter") 200 includes a complementer and Taylor Series correction block 250S for sine terms and a complementer and Taylor Series correction block 250C for cosine terms, as well as a dual ported LUT 210. Dual ported LUT 210 may be implemented with dual ported ROM or dual ported RAM. Notably, rather than a dual ported memory, separate synchronized memories may be used; however, this may consume additional area and resources. Each block 250S and 250C includes a multiplexer 213, a multiplier 211, and an adder/subtractor 212.

Converter 200 may be used in a DDS or NCO for phase-to-sinusoid conversion. For purposes of clarity by way of example and not limitation, it shall be assumed that converter 200 is used in a DDS. Notably, phase adjustment K 203 input to multipliers 211 is described below in additional detail with reference to FIG. 3.

A phase-accumulated signal is conventionally quantized, wherein most significant bits ("MSBs") are retained for providing an address to LUT 210. Accordingly, input 204 may be MSBs of a phase-accumulated signal which are provided to LUT 210 as an address. An MSB of MSBs provided via phase-accumulated input 204 is provided as a control select input 205 to multiplexer 213 of block 250S. The greatest two MSB of phase-accumulated input 204 are XOR'd by XOR gate 226, the output of which is provided as a control select input 225 to multiplexer 213 of block 250C. Notably, cosine is negative in the second and third quadrants, so XORing the two MSBs of phase-accumulated input 204 may be used to provide a cosine invert control signal. It should be appreciated that a bitstream of phase accumulations is provided for producing bitstreams of corrected sine and cosine values as described below. However, for purposes of clarity and not limitation the processing of a single value is described.

LUT 210 has stored therein values or samples for a sinusoid ("sinusoid values") 230. Sinusoid values 230 may be tabularized such that they are addressable responsive to input 204 for output from LUT 210 as respective sinusoid values. Input 204 may be provided to a first address port of LUT 210 for reading out a sine value as SIN output 206. In this example, only one quadrant of sine values are stored in LUT 210; however, it should be appreciated that more than one quadrant of sine values may be stored in LUT 210. For storing only one quadrant of sine values in LUT 210, input 204 may be provided to an address converter block 233-1 prior to input to LUT 210. Alternatively, address converter block 233-1 may be incorporated into LUT 210. Furthermore, it should be appreciated that cosine values or sine values or a combination thereof may be stored in LUT 210.

Input or bus 204 is further provided to a second address port of LUT 210. This second input to LUT 210 may be used for reading out a cosine value as COS output 207. Notably, input ports of LUT 210 in this example are configured for quadrant mapping; however, in an alternate embodiment circuitry external to LUT 210 may be used for example for quadrant mapping. For example, a sine to cosine address converter block 233-2 may optionally be coupled to receive input 204 for converting a first address associated with input 204 to a second address associated with conversion to an associated cosine value. Thus, for example, block 233-2 does not convert sine to cosine, rather the input phase may be inverted conditioned on two MSBs of a received address. In the example with a single quadrant of sine values 230 stored in LUT 210, blocks 233-1 and 233-2 are parts of both input paths of LUT 210, but the conditions in which the two block invert bits are different. Block 233-1 inverts for quadrants 2 and 4, whereas block 233-2 inverts for quadrants 1 and 3. The quadrant is defined by the two MSBs of input 204, where 00=first quadrant, 01=second quadrant, 10=third quadrant, and 11=forth quadrant.

Multiplexers 213 are used for inverting outputs of LUT 210 as part of quadrant mapping. To summarize, for quadrant 1 (i.e., 0 to 90 degrees) for sine, neither input nor output to and from LUT 210 is inverted. For quadrant 2 for sine, input to LUT 210 is inverted and output from LUT 210 is not inverted. For quadrant 3 for sine, input to LUT 210 is not inverted, but output from LUT 210 is inverted. For quadrant 4 for sine, both input and output to and from LUT 210 are inverted. For quadrant 1 for cosine, input to LUT 210 is inverted and output from LUT 210 is not inverted. For quadrant 2 for cosine, input to LUT 210 is not inverted, but output from LUT 210 is inverted. For quadrant 3 for cosine, both input and output to and from LUT 210 are inverted. For quadrant 4 for cosine, neither input nor output to and from LUT 210 is inverted.

Sine values 230 stored in LUT 210 are provided one at a time as SIN output 206 to a data input of multiplexer 213 of complementer block 250S and as COS output 207 to a data input port of multiplexer 213 of complementer block 250C via separate data output ports of dual ported LUT 210. Additionally, SIN output 206 is inverted by inverter circuitry 219 of block 250S for input to another data input port of multiplexer 213 of block 250S, and COS output 207 is inverted by inverter circuitry 219 of block 250C for input to another data input port of multiplexer 213 of block 250C.

The mapping of values depicted by input 204 to parts of a circle is arbitrary, and the values of any quadrant may be stored without significant difference to the arrangement. Input 204 in this example depicts phase from 0 to 360 degrees, notionally, but could depict −180 to +180, or −90 to +270, or some other depicting of a full circle. In the embodiments, where, for example, input 204 describes 0 to 360 degrees and sine values 230 are for the first quadrant, then multiplexer 213 of block 250S may use only the top bit or MSB of input 204 as a control select signal 205. In other mapping implementations of input 204 or one or more quadrants stored in LUT 210 or a combination thereof, the top two bits or MSBs of input 204 may be used for providing control select signaling to multiplexer 213 of block 250S. Thus, it should be appreciated that specific examples used herein are only for purposes of clarity and not limitation, as any of a variety of other implementations are within the scope of this description. Thus continuing the example, for block 250S, SIN output 206 from LUT 210 and inverted by inverter circuitry 219 of complementer block 221-1 may be selected for output from multiplexer 213 as SIN value 232 responsive to a logic 1 MSB of phase-accumulated input 204. Moreover, for a logic 0 for the MSB of phase-accumulated input 204, SIN output 206 from LUT 210 may be selected for output from multiplexer 213 as SIN value 232.

Sin(x) and cos(x), where x is a phase value or address to LUT 210, allows for derivation of cos(x) by quadrant mapping where sin(x)=cos(90−x) for a single quadrant of sinusoid values stored in LUT 210. Thus, for this quadrant mapping, phase input x is inverted. A Taylor Series correction circuit described below adds a correction factor to LUT 210 outputs of sin(x) and cos(x) values, which are somewhat coarse as described below in additional detail. The Taylor Series correction may be used to improve accuracy of output of blocks 250S and 250C. Thus, sin(x) may be said to be equal to sin(x(MS))+k*cos(x(MS)), where k is proportional to the phase error (x−x(MS)). It should be understood that x(MS) is a bus ripped from the MSBs of x, normalized to the same magnitude as x such that the difference is equal to the value of the bits not ripped. Moreover, it should be understood that k is may be phase adjustment K 203. Thus, MS indicates a number of MSBs of a phase accumulated signal ripped or quantized. Notably, the above mathematical example equation is for an implementation where the first two terms of the Taylor Series for sin(x) are used. However, higher order approximations may be implemented, but this may involve more hardware. Alternatively, the Taylor Series correction could be omitted entirely, as long as the user was aware that there was an extra bit of precision over accuracy.

For this example of block 250C, for a logic 1 output from XOR gate 226, inverted COS output 207 may be selected for output from multiplexer 213 as COS value 233. In other words, input of a 01 or 10 as two MSBs indicates the second or third quadrant. For a logic 0 output from XOR gate 226, non-inverted COS output 207 may be selected for output from multiplexer 213 as COS value 233.

SIN value 232 from multiplexer 213 of block 250S is provided as data input to adder 212 of block 250S and as a data input to multiplier 211 of block 250C. COS value 233 from multiplexer 213 of block 250C is provided as a data input to subtractor 212 of block 250C and as data input to multiplier 211 of block 250S. Notably, for this example embodiment, an adder 212 is used for block 250S and a subtractor 212 is used for block 250C; however, other configurations may be used as should be understood from this description. Furthermore, as generally indicated by dashed box 220-1, multiplier 211 and adder/subtractor 212 may be implemented as part of a single DSP block, such as an embedded DSP 106 of FPGA 100 of FIG. 1. As is known, embedded DSP block 106 has circuitry which may be implemented as either an adder or a subtractor. Thus, if a user would prefer outputs to be negated for example, output of multiplexer 213 may be inverted from this example for compensation by implementation of adder/subtractor 212 as a subtractor for example.

Notably, as indicated above, it is assumed that converter 200 has only a quarter of a full cycle of sine values 230 for purposes of phase-to-sinusoid conversion. Thus, a block 250S and a block 250C are used for SIN output 206 and COS output 207, as previously described. However, converter 200 may have half of a full cycle of sinusoid values 230 for purposes of phase-to-sinusoid conversion. If LUT 210 holds two quadrants of sinusoid values, then only one complementer block may be used on an output data port of LUT 210. However, because cos(x) equals sin(90−x), such complementer block 221-2 is present on the COS output 207 port. Still, it should be appreciated that by holding two quadrants of sinusoid values, complementer block 221-1 of block 250S may be omitted from converter 200.

Again, for purposes of clarity by way of example and not limitation, it shall be assumed that sine values 230 are only a quarter of a full cycle for purposes of phase-to-sinusoid conversion, and thus both complementer blocks 221-1 and 221-2 are implemented in converter 200. Moreover, for purposes of clarity, only block 250S is described below in detail, as blocks 250S and 250C are the same except for processing sine versus cosine terms and except cross-coupling of sine and cosine terms for such processing as described above.

SIN value 232 obtained from output of multiplexer 213 may be used for data input to adder 212, as described below in additional detail. Provided to adder 212 along with SIN value 232 is a logic 1 bit 202. Logic 1 bit 202 is placed in the least significant bit ("LSB") location as in effect concatenated to SIN value 232. Accordingly, this increases the bit width of this input to adder 212 by one bit.

As generally indicated by dashed box 220-1, multiplier 211 and adder 212 may be implemented as part of a single DSP block, such as an embedded DSP 106 of FPGA 100 of FIG. 1. For a Xilinx FPGA, such a DSP block 220-1 may be a DSP48 block with a 48-bit wide adder. Accordingly, it should be appreciated that digital-to-analog conversion of a corrected sine value 214S output from adder 212 would, for a significant majority of applications, be significantly less than 48 bits wide. Thus, even with the addition of logic 1 bit 202, there may be unused input bitlines of such an adder 212 in such a DSP 106, as generally indicated by lines 215. Input on lines 215 may be set to be concatenated logic 0s, as generally indicated. Notably, it should be understood that bit widths greater or less than 48-bits wide may be used.

In the DSP48 block of a Xilinx FPGA, connections from the multiplier output to the adder/subtractor are fixed. In an alternate embodiment, factor k, namely phase adjustment K 203, may be considered as $n*(2^m)$, where n is fed to the multiplier and m is implemented as a bit shift of the bus before it reaches the adder/subtractor. However, for a DSP48 block, this implementation would run afoul of the fixed wiring. Consequently, the bit shift, though in the opposite direction, may be implemented on the other input to the adder/subtractor. This is possible in implementations where bus 232 comes from outside the DSP48 block. The logic 0's concatenated after the logic 1 may thus be the embodiment of this bit shift. Also, there may be an accounting of the bit shift taken by picking output bits from bus 214 as output.

Stated another way, terms reaching the adder/subtractor are sin(x(MS)) and k*cos(x(MS)). Suppose k is for example 0.0013, but since multiplier 211 is an integer multiplier without floating point capability, k may be expressed as $n*(2^m)$, where n is an integer, which may be rounded or truncated. Multiplication by n is done by multiplier 211 and multiplication by $2^m$ is implemented by bit shifting the output bus. Such a bit shift involves no hardware, just a change of wiring. So, for instance if there was a result f(3 down to 0)=1100, or 12 in decimal notation, multiplication by $2^2$ could be accomplished by taking the bits f(3 down to 0) and appending "00," e.g. 110000, or 48 in decimal notation. Now, since there is no opportunity to shift the bus from multiplier 211 to adder/subtractor 212, the inverse shift is applied to bus 232. This shift affects the significance of output bus 214S, so such shift is accounted for there too. Thus, in an implementation, bus 232 may be sign-extended to 48 bits, which happens automatically in the hard-wiring of multiplier 211 to adder/subtractor 212, rather than pre-appending logic 0s.

Notably, no long carry chain need be used in complementer blocks 221-1 and 221-2. It should be appreciated that a long carry chain may cause significant delay in digital signal processing, and thus the omission of such a long carry chain may be a significant improvement in performance. Notably, there may still be a carry chain in adder/subtractors 212; however, because adder/subtractors are implemented with embedded DSP blocks, their speed may be significantly enhanced over use of programmable logic. Thus, overall speed may be improved such that blocks 250S and 250C may be enhanced. For example, enhancement of throughput speed may be useful where phase-to-sinusoid conversion is part of or associated with what is known as a "critical path," namely a speed of operation limiting path. Furthermore, it should be appreciated that in some prior implementations, a long carry chain may be broken up by use of pipelining in order to reduce delay associated therewith. However, such pipeline circuitry conventionally involves significantly more circuitry than that of conditional complementers 221-1 and 221-2.

For an FPGA implementation, LUT 210 may be implemented with LUT RAM formed of CLBs, or block RAM of an FPGA 100 of FIG. 1. Furthermore, multiplexer 213 and inverter circuitry 219 may be formed using programmable logic.

In order to avoid carry chain logic associated with a 2's complement on output from LUT 210, sine values 230 are preconditioned. Sine values 230 are preconditioned to be on average "half" or "0.5" of an LSB less than what one would expect to find in a conventional set of sine values, where such sine values in a conventional set would be rounded to the nearest integer. Thus, for example, if in a conventional set of sine values the value 0.43837 appeared for the sine of 26 degrees, a truncated value may be 0.4383. While in this example, the preconditioned value is "0.7" off with respect to an LSB position, the average for truncation of all sine values in a set may be "0.5" of an LSB position too small. The difference of half of an LSB position, namely 0.5 with respect to the LSB position, in this example is the average difference between rounding and truncating. Approaches other than truncation may be used to reduce each of the sine values 230 by half of an LSB, such as subtraction prior to storing in LUT 210.

Notably, it is not necessary that each of the sinusoid values 230 be reduced by half of an LSB, but on the whole the average of such sinusoid values generally is half of an LSB less than what one would expect to find in a conventional set of sinusoid values. However, for purposes of clarity by way of example and not limitation, because sinusoid values are conventionally calculated to a high precision, the example of truncated sine values 230 is used in the following description.

With truncation, it should be appreciated that some individual sinusoid values of sine values 230 may be the same value as in a conventional set of sine values, and some sine values 230 will be one LSB lower, such that the average of the set of sine values 230 is half of an LSB lower than the average of a conventional set of sine values. Although an example of a quadrant of a cycle of sine values 230 is used, it should be appreciated that more than a quadrant and less than a full cycle of sinusoid values may be stored in LUT 210.

Notably, DSP block 220-2 may be implemented in a single DSP embedded block for producing a corrected cosine value 214C. Accordingly, use of a single DSP block with no carry chain in conditional complementer block 221-2 may reduce delay associated with phase-to-sinusoid conversion.

SIN output 206 and COS output 207 from LUT 210 may or may not be complemented by respective inverter circuitry 219. Thus, inverted SIN output 206 and COS output 207 are on average are half of an LSB too low too. The result of the 1's complement, namely inversion by inverter circuitry 219, is a set of sine and cosine sinusoid values which are on average half of an LSB lower than a comparable conventional set of such values. Accordingly, by concatenating a resulting sinusoid value, or resulting word for example, with a logic 1 LSB, the sinusoid value may be increased by half of an LSB on average. In other words, for the logic 1 added as an LSB, namely a separate added bit to the data width of the sinusoid value, such added LSB has a value of 0.5 with respect to an LSB position of a sinusoid value. Because the logic 1 is provided as an LSB of a resulting sinusoid value, and added regardless of the sign of the sinusoid value, it compensates for the 0.5 built-in error of stored sinusoid values, namely sine values 230 in this example, for both positive and negative values. With the addition of this compensation for both positive and negative sinusoid values, resulting sinusoid values on average may be equal to having done a 2's complement on non-preconditioned sinusoid values.

Figure 3:
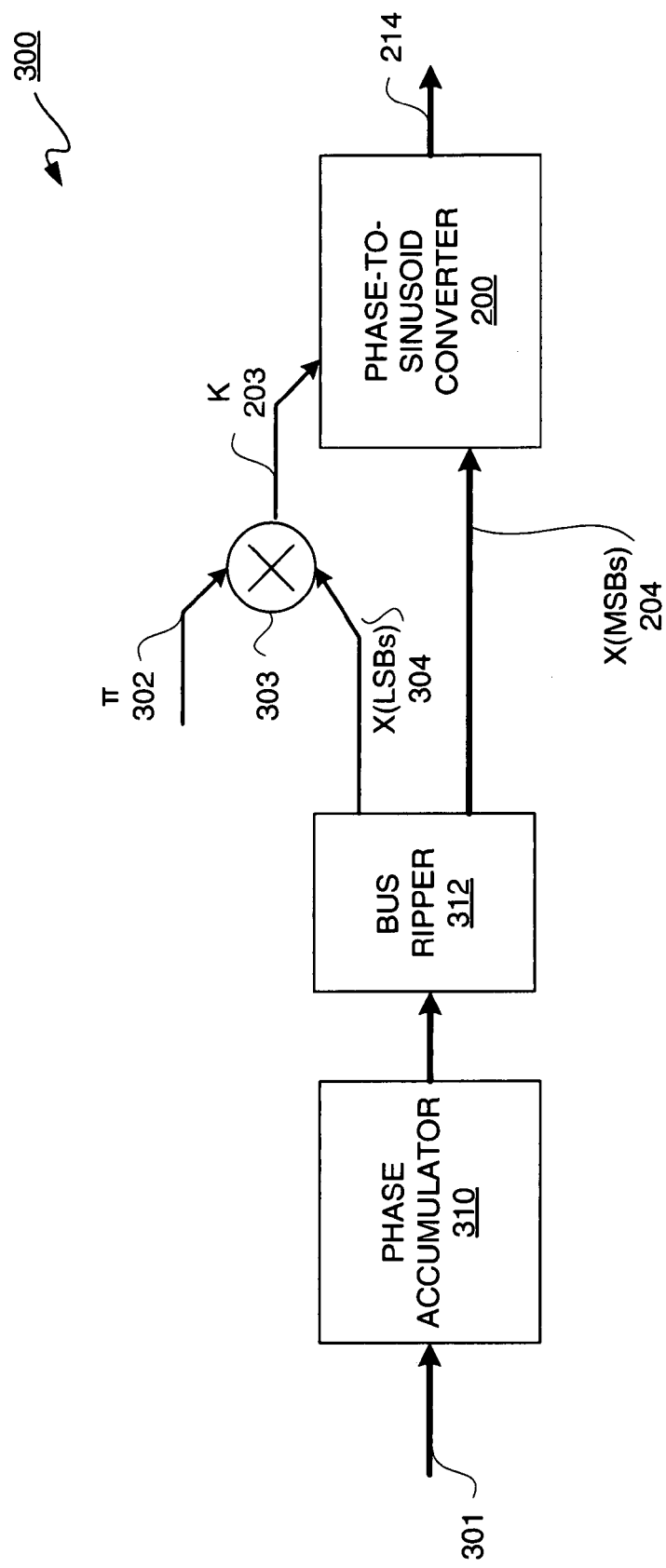
FIG. 3 is block diagram depicting an exemplary embodiment of a direct digital synthesis system.

FIG. 3 is block diagram depicting an exemplary embodiment of a DDS system 300. DDS system 300 includes phase accumulator 310, bus ripper or quantizer 312, multiplier 303, and phase-to-sinusoid converter 200 of FIG. 2. A phase increment 301 may be provided to phase accumulator 310 for providing a phase-accumulated signal output to bus ripper 312. MSBs of such a phase-accumulated signal may be separated out by bus ripper 312 for providing as phase-accumulated input 204 to phase-to-sinusoid converter 200. LSBs from a phase-accumulated signal output from phase accumulator 310 may be separated out by bus ripper 312 for phase-accumulated input 304 to multiplier 303.

Notably, multiplier 303 may be part of phase-to-sinusoid converter 200, but is shown as separate from phase-to-sinusoid converter 200 for purposes of describing generation of phased adjustment K 203. LSBs of a phase-accumulated signal, namely phase-accumulated input 304, are multiplied by a value of π 302 for providing phase adjustment K 203. Responsive to phase adjustment K 203 and MSBs of phase-accumulated input 204, phase-to-sinusoid converter 200 generates a corrected sinusoidal value 214. Referring again to FIG. 2, it should be appreciated that such outputs have the same accuracy as in a conventional 2's complement implementation but with an extra bit of precision. Notably, corrected sinusoidal value 214 may or may not be provided as an input to a digital-to-analog converter. For an FPGA implementation, it should be appreciated that DSPs 106 of FIG. 1 may be cascaded together. Accordingly, multiplier 303 may be part of one DSP block, which is cascaded with one or more other DSP blocks, such as DSP blocks 220-1 and 220-2 of FIG. 2, used for implementing phase-to-sinusoid converter 200.

Figure 4:
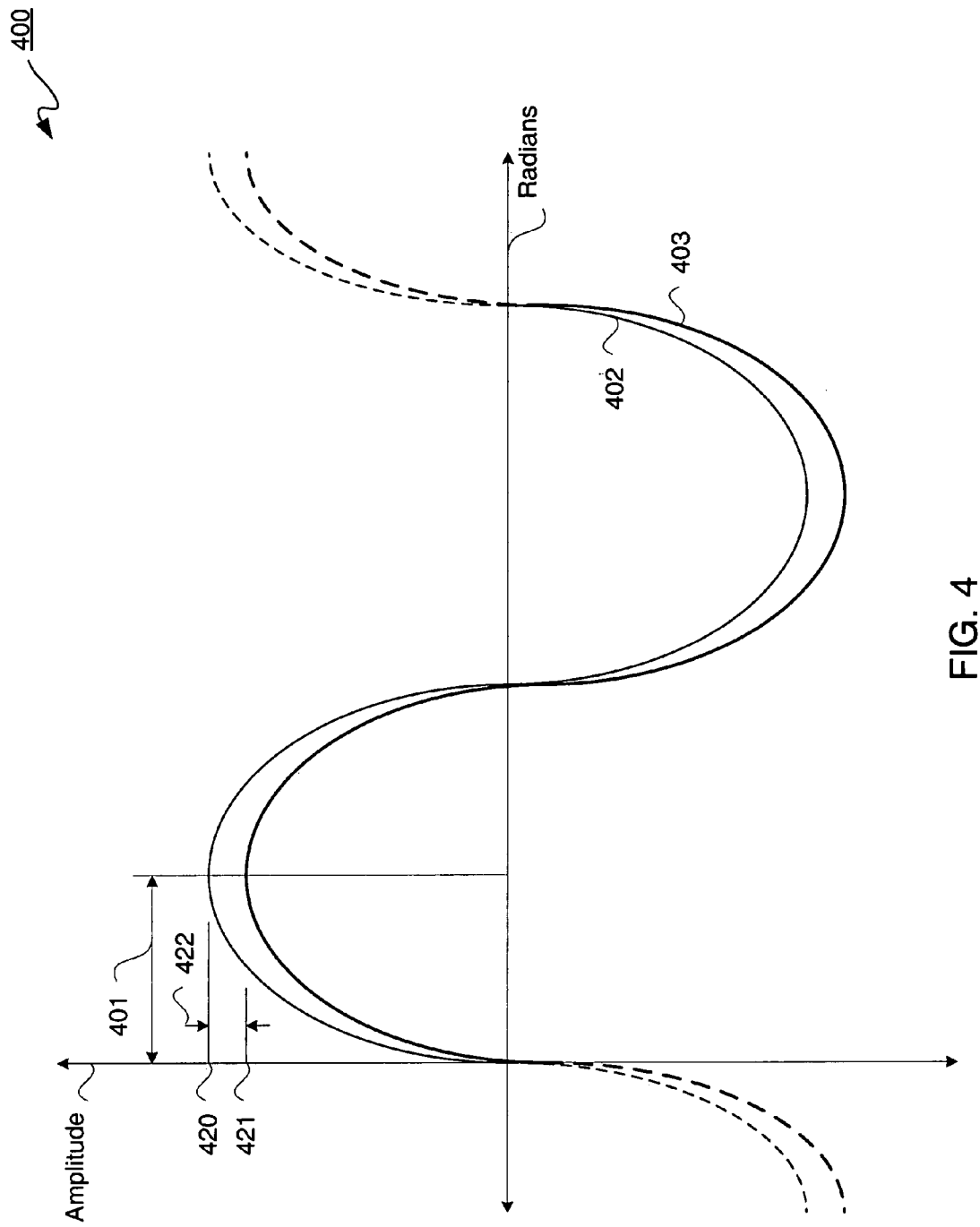
FIG. 4 is a signal diagram depicting an exemplary embodiment of a sine wave shift in accordance with preconditioning of sinusoid values of the phase-to-sinusoid converter of FIG. 2.

FIG. 4 is a signal diagram depicting an exemplary embodiment of a sine wave shift 400 in accordance with preconditioning of sine values 230 of FIG. 2. Sine wave 402 indicates that it has a maximum amplitude 420. After preconditioning sine values 230 for sine wave 402, amplitude of sine wave 402 is shifted down, as generally indicated by sine wave 403. Thus, for example, maximum amplitude 421 of sine wave 403 is less than maximum amplitude 420 of sine wave 402. Difference 422 between amplitudes of sine waves 402 and 403 may be thought of as a 0.5 on average shift with respect to an LSB position as between respective sets of sinusoid values for sine waves 402 and 403. Notably, sine wave graphs of FIG. 4 may thus be thought of as a comparison of SIN value or bus 232 signaling with reference to sine wave 403 and a conventional sine wave with reference to sine wave 402. However, it should be understood that although continuous sine wave values are illustratively shown in FIG. 4, actual values would be discrete digital values until after a digital to analog conversion. Furthermore, though curves of sine waves 402 and 403 illustratively show the average values of the points, in actuality digitization of the individual points would cause approximately half of the points to be the same in either sine wave 402 or 403 and a logic 1 LSB higher in sine wave 402 for the other half of the set of values.

Alternatively, difference 422 may be thought of as a 0.5 shift on average with respect to a least significant decimal place of a sinusoid value. Notably, individual difference 422 between maximum amplitudes 420 and 421 respectively of sine waves 402 and 403 may be greater than half of an LSB position, or least significant decimal place, thereof. Again, it should be appreciated that only a portion of a the values for a sine wave need be stored, such as for example a region 401 from 0 to π/2 radians.

Figure 5:
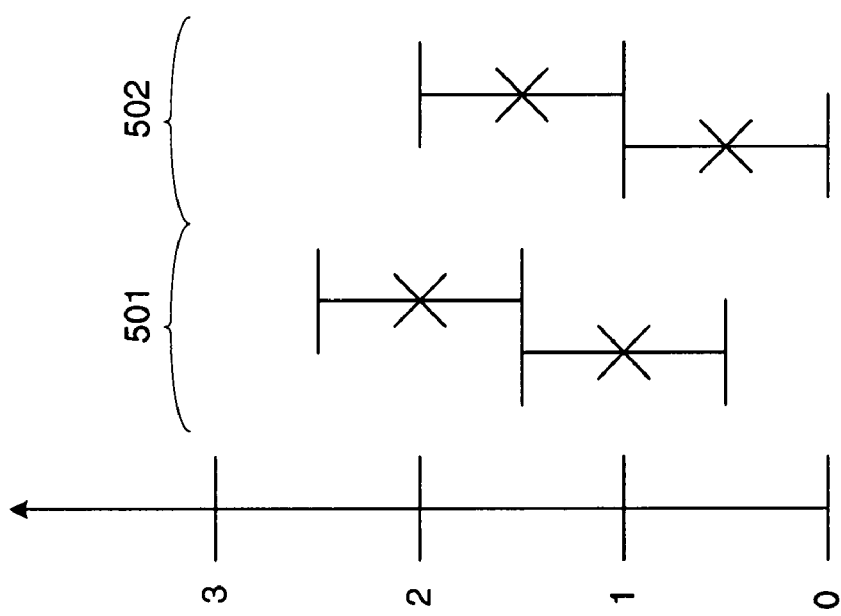
FIG. 5 is a number diagram depicting a comparison of an example of a conventional two's complement to an example of a mapping of real-to-finite bit resolution for phase-to-sinusoid conversion such as for the phase-to-sinusoid converter of FIG. 2.

FIG. 5 is a number diagram depicting a comparison of an example of a conventional 2's complement 501 to an example of a mapping of real-to-finite bit resolution 502 for phase-to-sinusoid conversion such as for the phase-to-sinusoid converter of FIG. 2. For a conventional 2's complement 501, rounding is used for fixed precision representation of real numbers. However, for mapping of real-to-finite bit resolution 502, truncation plus 0.5 to an LSB location is used. With rounding for 2's complement 501, the values of 1 and 2 respectively span ranges of approximately 0.5 to 1.5 and 1.5 to 2.5. Thus, with 2's complement 501 rounding, real numbers in the range of approximately 1.5 to 2.5, for example, will map to 2.

With mapping of real-to-finite bit resolution 502, a 1's complement and the addition of 0.5 to an LSB location, numbers in a range of 1 to 2, not inclusive, will map to 1.5. Notably, results for both conventional 2's complement 501 and mapping of real-to-finite bit resolution 502 as described herein have the same accuracy in that the maximum error is 0.5 with respect to an LSB position. However, as indicated above, to obtain this accuracy using a 1's complement, an extra bit is added to represent the 0.5 added value to the LSB location. Furthermore, there is no. DC difference between these two approaches; nor is there a discontinuity in values going from negative to positive.

Although the result is one bit longer in data width due to the addition of a logic 1 as an LSB, it should be appreciated that granularity of primitives, such as a DSP48 in Xilinx FPGAs, may have sufficient data width such that no additional circuitry is employed for the added bit position. Continuing the example of the DSP48, the 48-bit adder component of a DSP primitive, or embedded block, is capable of handling bit widths up to 48 bits. It should be appreciated that in a conventional digital-to-analog conversion of a digitally generated sinusoid, generally significantly less than 48-bit inputs are used.

Notably, a DDS with Taylor Series correction optionally may be implemented. With renewed reference to block 250S of FIG. 2 for example, it should be appreciated that sine values 230 in LUT 210 are of a lower precision than corrected sine value 214S for example, which lower precision facilitates a smaller memory footprint for LUT 210. LUT 210 followed by adder 212 allows for extrapolation from sine values 230 tabularized in LUT 210. For either inverted or non-inverted sinusoidal output from multiplexer 213, it should be appreciated that input to multiplier 211 is effectively the gradient or coefficient that may be used in a Taylor Series correction for a quadrature output. More particularly, sin(x) output may be used to obtain the gradient for cos(x) and hence used to extrapolate a higher precision from cos(x).

A Taylor Series correction factor may thus be obtained by multiplying a phase error, such as phase adjustment K 203, by a gradient, namely output from multiplexer 213 of the other complementer block. Thus, for example, the gradient of sine value 232 is a corresponding cosine value 233. Thus, the Taylor Series correction factor for sine value 232 is obtained by multiplying the corresponding cosine value 233 by an associated phase adjustment K 203. The corrected magnitude of such a correction may be smaller than the primary output, namely for this example corrected sine value 214S. Accordingly, fewer bits in data width of sine values 230 output from LUT 210 may be used for correction than for providing such a primary output. Thus, it should be appreciated that gradient input bus for providing a cosine value 233 to multiplier 211 may be a portion of the bits of a bus used for providing sine value 232. Thus, the gradient input buses to multipliers 211 may be rounded without incurring a significantly long carry chain. Furthermore, it should be appreciated that the gradient input buses to multipliers 211 may be significantly small to the extent truncation error may be tolerated. Furthermore, if this Taylor Series correction may be omitted entirely, there may be no carry chain in either of blocks 250S and 250C.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A phase-to-sinusoid converter, comprising:
a lookup table associated with input mapping circuitry;
the lookup table having at least one quadrant of values for a sinusoidal signal stored therein;
the at least one quadrant of values being reduced from associated predetermined values thereof;
the lookup table configured to have two address ports and two data out ports respectively associated with the address ports;
the lookup table coupled to receive a first portion of a phase-accumulated signal to the address ports and configured to map the first portion of the phase-accumulated signal to an associated quadrant for providing a cosine value and a sine value obtained from the at least one quadrant of values;
control circuitry coupled to receive the cosine value and the sine value for selective inverting thereof for quadrant mapping, the cosine value being inverted for the phase-accumulated signal being in the second or third quadrants, the sine value being inverted for the phase accumulated signal being negatively signed;
a first multiplier coupled to receive at least a portion of the sine value output from the lookup table and to receive a phase adjustment; and
the first multiplier configured to multiply at least the portion of the sine value received with the phase adjustment to generate a first correction factor, wherein the first correction factor is proportional to phase error.

2. The converter according to claim 1, further comprising:
a first adder/subtractor coupled to receive the first correction factor and the cosine value;
the first adder/subtractor further coupled to receive a logic 1 bit followed by concatenated bit-shifted logic 0s, the logic 1 bit received as a Least Significant Bit with respect to the cosine value increasing data width of the cosine value by one bit;
the first adder/subtractor configured to output a corrected cosine value responsive to summation of the first correction factor, the logic 1 bit, the concatenated bit-shifted logic 0s, and the cosine value;
a second multiplier coupled to receive at least a portion of the cosine value output from the lookup table and to receive the phase adjustment;
the second multiplier configured to multiply at least the portion of the cosine value received with the phase adjustment to generate a second correction factor;
a second adder/subtractor coupled to receive the second correction factor and the sine value;
the second adder/subtractor further coupled to receive the logic 1 bit followed by the concatenated bit-shifted logic 0s, the logic 1 bit received as a Least Significant Bit with respect to the sine value increasing data width of the sine value by one bit; and
the second adder/subtractor configured to output a corrected sine value responsive to summation of the second correction factor, the logic 1 bit, the concatenated bit-shifted logic 0s, and the sine value.

3. The converter according to claim 1, wherein the at least one quadrant of values is at least one quadrant of a sample sinusoid signal shifted down in amplitude from a reference sinusoid signal associated with the predetermined values.

4. The converter according to claim 3, wherein the predetermined values are in part truncated to provide the at least one quadrant of values.

5. The converter according to claim 4, wherein the at least one quadrant of values on average are shifted down by half of a least significant bit position.

6. The converter according to claim 5, wherein the first portion of the phase accumulated signal is formed exclusively of Most Significant Bits of the phase accumulated signal.

7. The converter according to claim 2, wherein the first multiplier and the first adder/subtractor are implemented with a first embedded digital signal processing block of a programmable logic device; and wherein the second multiplier and the second adder/subtractor are implemented with a second embedded digital signal processing block of the programmable logic device.

8. A phase-to-sinusoid converter, comprising:
first quadrant mapping circuitry coupled to receive a first portion of a phase-accumulated signal for providing a first address;
a lookup table coupled to receive the first address;
the lookup table having at least one quadrant of values for a sinusoidal signal stored therein;
the at least one quadrant of values being reduced from associated predetermined values thereof;
the lookup table configured to output a first sinusoid value from the at least one quadrant of values responsive to the first address;
first inverter circuitry coupled to receive the first sinusoid value and configured to provide a first inverted sinusoid value;
first multiplexer circuitry coupled to receive the first sinusoid value and the first inverted sinusoid value as respective first data inputs;
the first multiplexer circuitry further coupled to receive a first control select signal responsive to a first part of the first portion of the phase-accumulated signal, the first control select signal for selecting the first inverted sinusoid value or the first sinusoid value as a first sinusoidal interim output;
a first adder/subtractor coupled to receive the first sinusoidal interim output;
the first adder/subtractor further coupled to receive a logic 1 bit and bit-shifted logic 0s, the logic 1 bit received as a first Least Significant Bit with respect to the first sinusoidal interim output increasing data width of the first sinusoidal interim output by one bit;
a first multiplier coupled to receive at least a portion of a second sinusoidal interim output and to receive a phase adjustment, the second sinusoidal interim output being for one of sine or cosine terms, the first sinusoidal interim output being for the other one of the sine or cosine terms;
the first multiplier configured to multiply at least the portion of the second sinusoidal interim output with the phase adjustment to generate a first correction factor proportional to first phase error;
second multiplexer circuitry coupled to receive a second sinusoid value and a second inverted sinusoid value as respective second data inputs;
the second multiplexer circuitry further coupled to receive a second control select signal responsive to one of a second part or the first part of the first portion of the phase-accumulated signal, the second control select signal for selecting the second inverted sinusoid value or the second sinusoid value as the second sinusoidal interim output;
a second multiplier coupled to receive at least a portion of the first sinusoidal interim output and to receive the phase adjustment;
the second multiplier configured to multiply at least the portion of the first sinusoidal interim output with the phase adjustment to generate a second correction factor proportional to second phase error; and
the first adder/subtractor configured to provide a first sinusoidal output.

9. The converter according to claim 8, further comprising:
the first adder/subtractor further coupled to receive the first correction factor; and
the first adder/subtractor configured to output the first sinusoidal output responsive to summation of the first correction factor, the logic 1 bit, the bit-shifted logic 0s, and the first sinusoidal interim output.

10. The converter according to claim 9, further comprising:
second quadrant mapping circuitry coupled to receive the first portion of the phase-accumulated signal for providing a second address;
the lookup table coupled to receive the second address;
the lookup table configured to output the second sinusoid value from the at least one quadrant of values responsive to the second address, the lookup table being associated with a memory device having a first address port for receiving the first address and a second address port for receiving the second address and having a first data output port for providing the first sinusoid value and a second data output port for providing the second sinusoid value;
second inverter circuitry coupled to receive the second sinusoid value and configured to provide the second inverted sinusoid value; and
a second adder/subtractor coupled to receive the second sinusoidal interim output;
the second adder/subtractor further coupled to receive the logic 1 bit and the bit-shifted logic 0s, the logic 1 bit received as a second Least Significant Bit with respect to the second sinusoidal interim output increasing data width of the second sinusoidal interim output by one bit; and
the second adder/subtractor configured to provide a second sinusoidal output.

11. The converter according to claim 10, further comprising:
the second adder/subtractor further coupled to receive the second correction factor; and
the second adder/subtractor configured to output the second sinusoidal output responsive to summation of the second correction factor, the logic 1 bit, the bit-shifted logic 0s, and the second sinusoidal interim output.

12. The converter according to claim 11, wherein the at least one quadrant of values on average are shifted down by half of a least significant bit position.

13. The converter according to claim 11, wherein the at least one quadrant of values are provided in part by truncating predetermined sinusoidal values of at least one quadrant of values for the sinusoidal signal.

14. The converter according to claim 13, wherein the at least one quadrant of values are for a type of sinusoid selected from a group consisting of sine values and cosine values.

15. The converter according to claim 14, wherein the first portion of the phase accumulated signal is formed exclusively of Most Significant Bits of the phase accumulated signal.

16. The converter according to claim 15, wherein the first multiplier and the first adder/subtractor are implemented within a first embedded digital signal processing block of a programmable logic device; and wherein the second multiplier and the second adder/subtractor are implemented within a second embedded digital signal processing block of the programmable logic device.

17. A phase-to-sinusoid converter configured to perform a method for direct digital synthesis, the method comprising:
 mapping of real-to-finite bit resolution of at least one quadrant of values for a sinusoidal signal to provide at least one quadrant of preconditioned values;
 the at least one quadrant of preconditioned values being on average shifted down by half of a least significant bit position;
 storing the at least one quadrant of preconditioned values in a lookup table of the converter;
 obtaining Most Significant Bits of a phase-accumulated signal as a first address;
 first accessing from the lookup table a first sinusoid value from the at least one quadrant of preconditioned values responsive to the first address; and
 adding at least a logic 1 as a Least Significant Bit to a first interim output associated with the first sinusoid value to provide a first adjusted sinusoid value having a bit width greater than that of the first sinusoid value for providing a first digitally synthesized sinusoidal value;
 adding the first adjusted sinusoid value with a first correction factor to provide a corrected version of the first digitally synthesized sinusoidal value;
 the first correction factor obtained by:
  obtaining Least Significant Bits of the phase-accumulated signal representing an error portion of the phase-accumulated signal;
  obtaining a value for pi;
  multiplying the value for pi with the Least Significant Bits of the phase accumulated signal to provide a phase adjustment; and
  multiplying at least a portion of a second sinusoid value and the phase adjustment to provide the first correction factor, the second sinusoid value being a gradient of the first sinusoid value.

18. The method according to claim 17, further comprising:
 at least routing at least one Most Significant Bit of the Most Significant Bits of the phase-accumulated signal to provide a first control select signal;
 inverting the first sinusoid value obtained from the lookup table to provide a first inverted sinusoid value; and
 multiplexing the first sinusoid value and the first inverted sinusoid value to provide either the first sinusoid value or the first inverted sinusoid value as the first interim output responsive to the first control select signal.

19. The method according to claim 18, further comprising:
 using the Most Significant Bits of the phase-accumulated signal obtained to provide a second address though associated with a different sinusoidal function than that of the at least one quadrant of preconditioned values;
 second accessing from the lookup table the second sinusoid value from the at least one quadrant of preconditioned values responsive to the second address, the lookup table being implemented in dual ported memory for respectively receiving the first address and the second address and respectively providing the first sinusoid value and the second sinusoid value;
 the first accessing and the second accessing including quadrant mapping capability for providing the first address and the second address, respectively;
 adding at least the logic 1 as the Least Significant Bit to a second interim output associated with the second sinusoid value to provide a second adjusted sinusoid value having a bit width greater than that of the second sinusoid value for providing a second digitally synthesized sinusoidal value;
 adding the second adjusted sinusoid value with a second correction factor to provide a corrected version of the second digitally synthesized sinusoidal value;
 the second correction factor obtained by multiplying at least a portion of the first sinusoid value and the phase adjustment to provide the second correction factor, the first sinusoid value being a gradient of the second sinusoid value;
 generating a second control select signal from at least two of the Most Significant Bits of the phase-accumulated signal;
 inverting the second sinusoid value obtained from the lookup table to provide a second inverted sinusoid value; and
 multiplexing the second sinusoid value and the second inverted sinusoid value to provide either the second sinusoid value or the second inverted sinusoid value as the second interim output responsive to the second control select signal.

* * * * *